United States Patent [19]

Wells

[11] 4,223,508
[45] Sep. 23, 1980

[54] DOUBLE-KNIFE CUT-OFF FOR CHUB MACHINE

[75] Inventor: Roy E. Wells, Davenport, Iowa
[73] Assignee: The Kartridg Pak Co., Davenport, Iowa
[21] Appl. No.: 933,998
[22] Filed: Mar. 16, 1978
[51] Int. Cl.³ ............................................. B65B 9/08
[52] U.S. Cl. ................................. 53/138 R; 53/552
[58] Field of Search ................ 53/416, 417, 451, 551, 53/552, 554, 138 R, 372, 138 A, 548

[56] References Cited
U.S. PATENT DOCUMENTS

| 3,324,621 | 6/1967 | Runge | 53/138 A |
| 3,587,204 | 6/1971 | George | 53/138 A |

*Primary Examiner*—Travis S. McGehee
*Attorney, Agent, or Firm*—Lockwood, Dewey, Alex & Cummings

[57] ABSTRACT

A chub packaging machine, or the like, incorporates a double-knife cut-off or severing device of the invention. Chub packages are elongate tubular packages which are gathered at their opposed ends and have metal clips clinched therearound to close those ends. The double-knife cut-off device is mounted on the closure head assembly of a conventional chub packaging machine, with appropriate modification, and produces a shorter and cleaner stub end on a chub package than heretofore available. The appreciable amounts of product trapped in the stub ends of chub packages formed on conventional chub machines are substantially eliminated by shortening the stub ends to approximately one-third the usual length. The double knife cut-off device severs a short gathered portion of the tubing between two packages at two spaced apart positions rather than in the center of the portion as heretofore known. A separate piece of package scrap is formed between the double knives as they cut through the short length of gathered tubing, and a scrap removing finger positioned between the knives removes that scrap from the path of travel of the individual packages so it may be conveniently collected and discarded.

8 Claims, 12 Drawing Figures

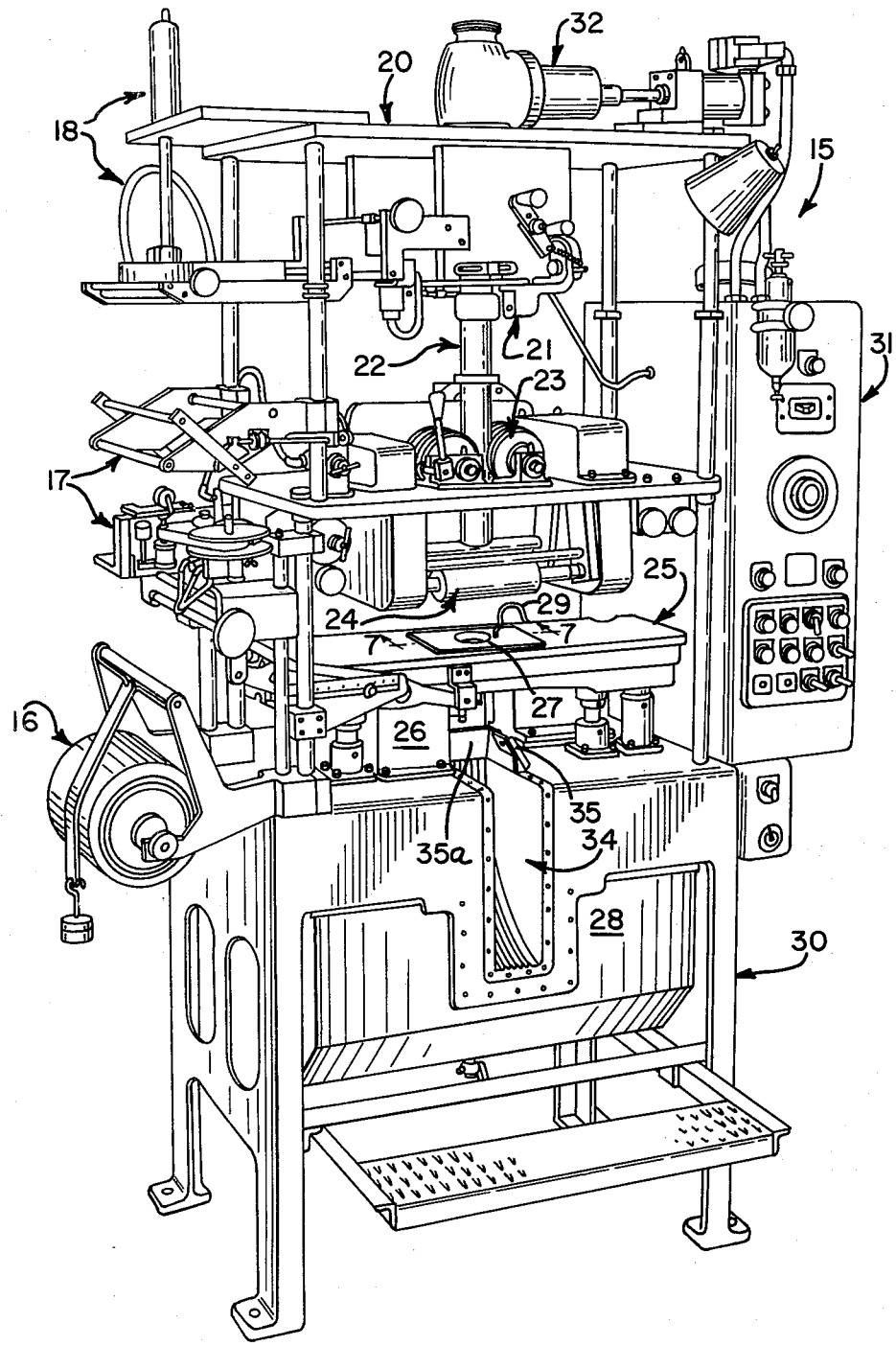
Fig_1_

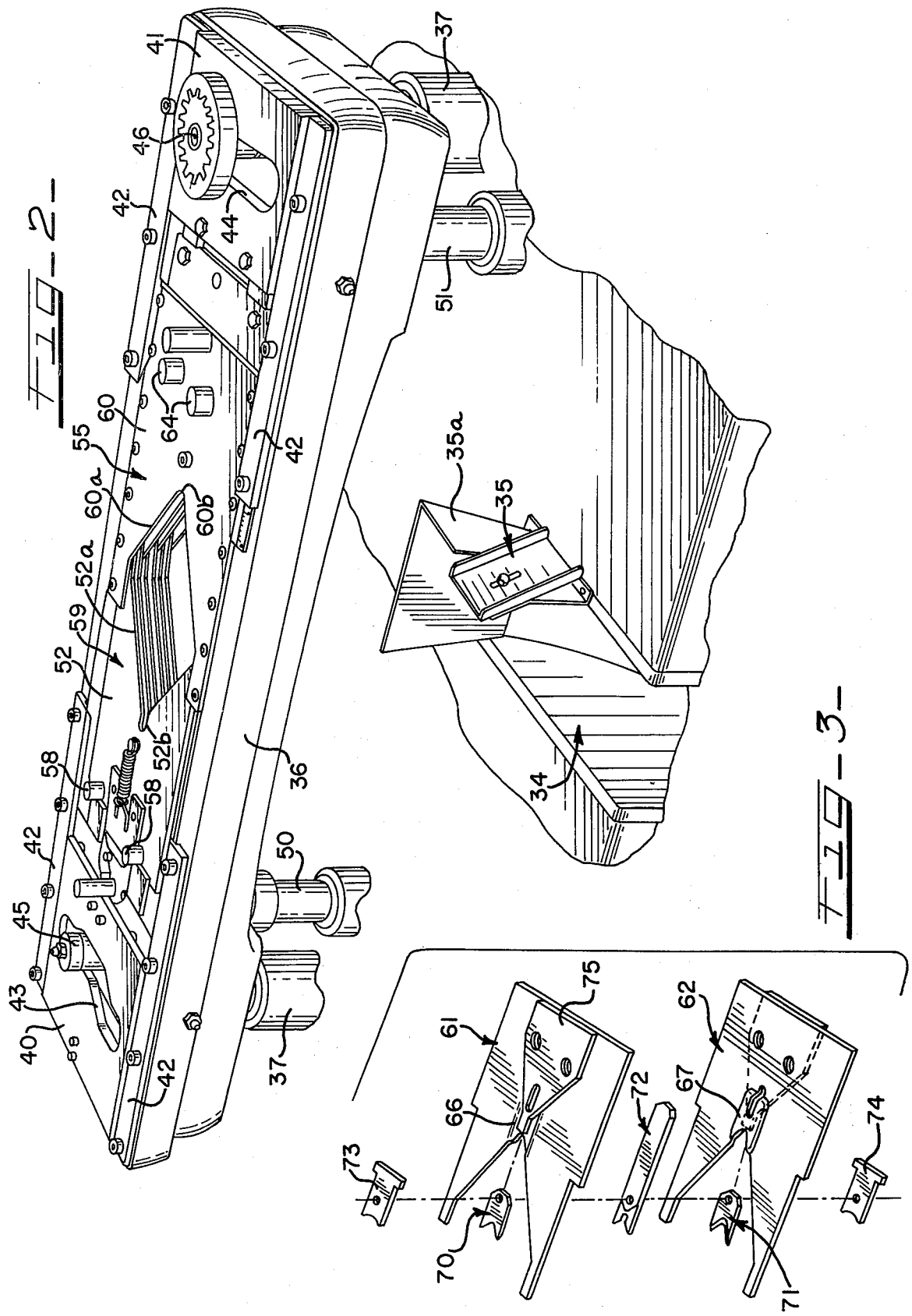

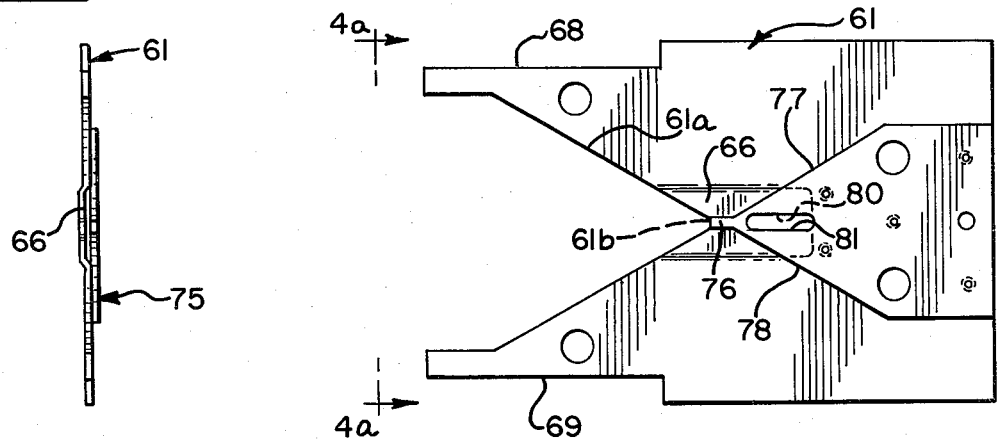
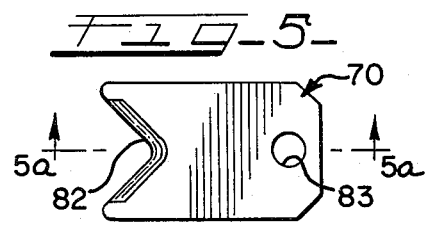
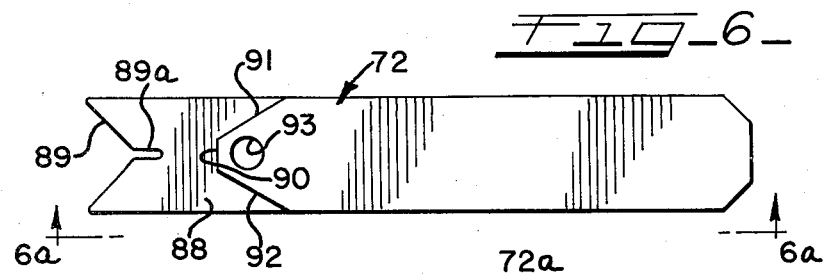
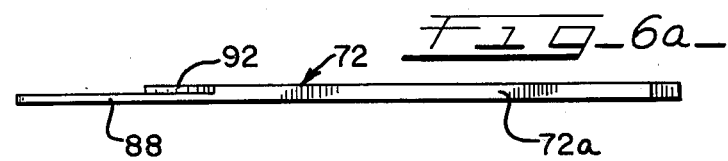

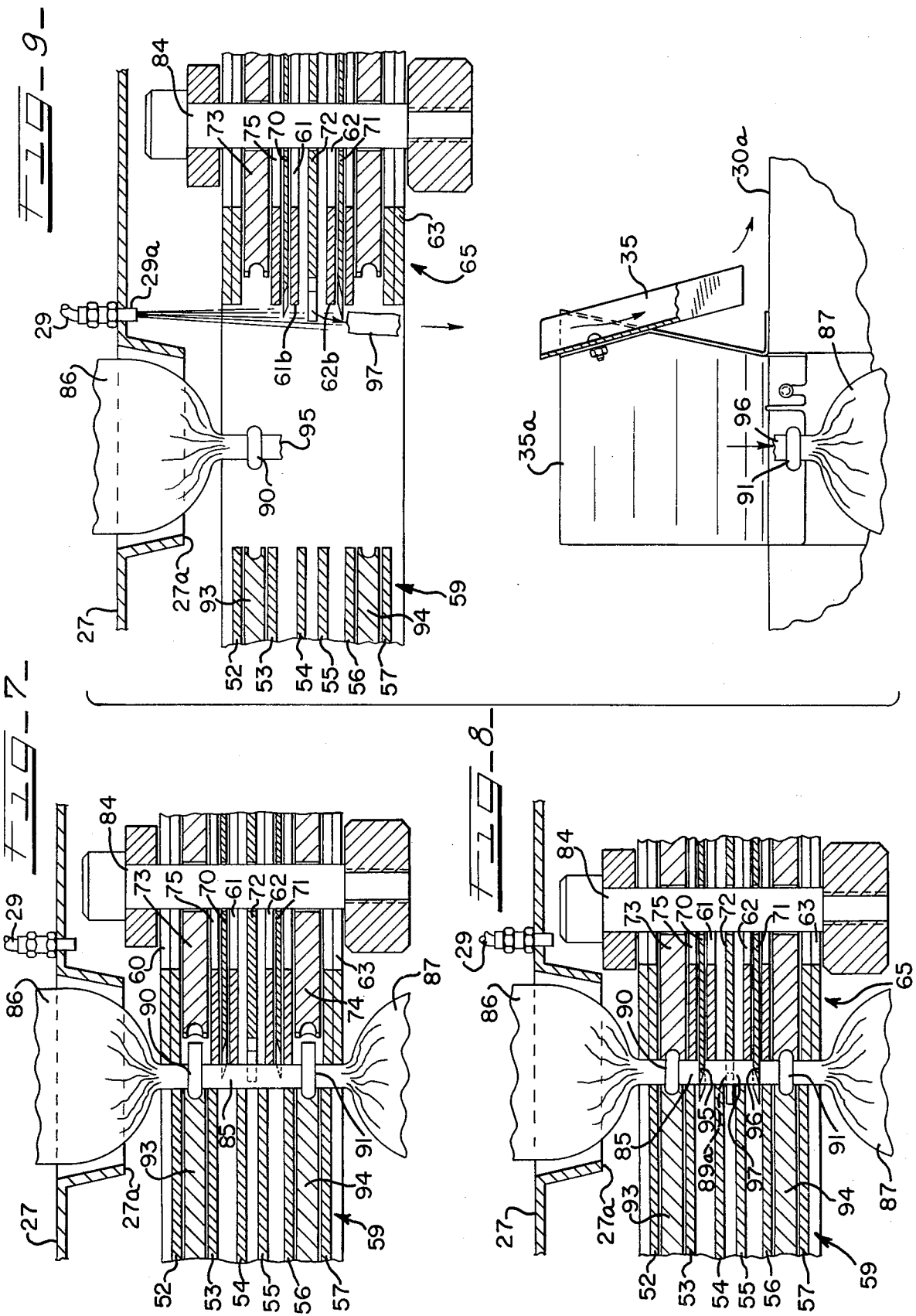

DOUBLE-KNIFE CUT-OFF FOR CHUB MACHINE

This invention relates, generally, to advancements and improvements in package-forming machines, and more particularly, machines which form generally tubular packages in a continuous or intermittent manner, such as the chub machine. An early form of the chub machine was the subject matter of U.S. Pat. No. 2,831,302, issued Apr. 22, 1958. Innovations and improvements on the original machine form the subject matter of U.S. Pat. Nos. 3,149,447, issued Sept. 22, 1964; 3,324,621, issued June 13, 1967; 3,795,083, issued Mar. 5, 1974; 3,992,854, issued Nov. 23, 1976; and a co-pending patent application, Ser. No. 870,606, filed Jan. 19, 1978, and assigned to the assignee of the instant application. Chub packaging machines are in wide use, described in printed service manuals, and have been commercially available from the Kartridg Pak Company of Davenport, Iowa for a number of years. Chub machines can be used for packaging many flowable or extrudable materials. For example, edible products such as ground meat, cheese, and liver sausage and inedible products such as explosives have been packaged using the chub machine. Further, the tubular packaging membrane may be formed into two continuous compartments, one within the other for packaging adhesives with a resin positioned in one compartment and a catalyst in the other compartment.

A chub machine continuously forms a tube of plastic packaging material, fills the tube with a flowable material, gathers or constricts a short length of that tubing, applies a pair of closure clips to each gathered length of tubing, and severs the gathered material between the individual clips in a pair thereof.

Heretofore, most models of the chub machine have included a so-called closure head assembly which performs all three of the above functions, i.e., gathering, clip-applying, and severing. The assembly includes a pair of opposing closure heads which are slidably mounted in a carriage on the machine for movement toward and away from each other so as to define a variable sized aperture therebetween. The continuously formed tube with fluid material therein passes through the aperture generally perpendicularly to the closure heads. Further, the closure head carriage reciprocates between upper and lower positions in order to synchronize performance of those three functions with the continuous movement of the tube and fluid therein downwardly through the machine.

The patents and patent application denoted above disclose that the fluid material in the tube is "voided" or "displaced" from a short length of tubing prior to the gathering or constricting function of the closure heads. As a practical matter, the complete displacement of fluid material from a short length of the tubing is not normally achieved. Either small droplets or deposits of fluid material remain in the so-called voided length of tubing, or a backlash effect from the voiding causes some material to re-enter the gathered length of tubing before a pair of spaced closure clips are securely fastened therearound. In chub machines, the spacing between individual closure clips in a pair thereof approximates nine-sixteenths inch. Heretofore, such packaging machines have been made to sever the gathered tubing midway between the pair of attached closure clips, leaving a package tail or stub which extends approximately nine-thirty seconds inch beyond each clip. As stated previously, this stub may contain small droplets or deposits of fluid material and the cut end of the stub is open to the surrounding air. This residual product, particularly when the product is a food, is undesirable primarily from a cosmetic standpoint.

The improvement of the present invention results in a decrease in the length of the tail or stub of gathered tubing extending from each closure clip by incorporating, in a chub packaging machine, or the like, a dual severing mechanism which is mountable on existing chub machines and includes a pair of spatially related knives mounted on one of the closure heads for parallel horizontal sliding movement therein. The spatially related knives sever the short length of gathered tubing between the pair of closure clips at two discrete positions, with a severed end of each package being positioned substantially closer to its adjacent closure clip than has been practical in heretofore known similar packaging machines.

The invention further includes a scrap product removing finger positioned in one closure head of the assembly in the space between the pair of knives. A bifurcated distal end on the scrap removing finger surrounds the gathered tubing prior to the dual severing movement of the knives. A separate short piece of gathered tubing, which is formed by the dual severing action, is retained in the scrap removing finger after the severing action takes place. As the pair of closure heads move away from each other to allow the completed package to enter the large discharge chute, and the product filled tube to pass between the heads, the severed scrap of gathered tubing in the finger is moved with that closure head to one side of the path of package travel. When the closure head reaches a retracted position, the finger is withdrawn into the head. The scrap of tubing retained in the finger is freed by portions of adjacent closure plates in the head positioned immediately above and below the finger.

The invention further includes an air/gas flow directing mechanism which forces each freed scrap tubing into a separate small discharge chute in the chub machine.

The object of the invention, generally stated, is to provide within a chub machine, or the like, substantially as presently constructed, a cutter or severing mechanism which provides a shorter tail or stub on each end of a chub package than heretofore practical with such machines.

Certain more specific objects and several advantages of the present invention will become apparent from the following detailed description of a presently preferred embodiment thereof taken in conjunction with the accompanying drawings, wherein:

FIG. 1 is a perspective view of a chub packaging machine in which the improvement of the present invention has been incorporated;

FIG. 2 is a perspective view, on enlarged scale, with portions removed for clarity, of the closure head assembly and discharge chutes for the chub machine shown in FIG. 1;

FIG. 3 is an exploded perspective view of the double knife severing mechanism of the invention and the co-acting clip clinching anvils which are incorporated in the right closure head of the closure head assembly shown in FIG. 2;

FIG. 4 is a top plan view on enlarged scale of one of the closure plates shown in FIG. 3.

FIG. 4a is an end elevational view taken along line 4a13 4a of FIG. 4;

FIG. 5 is a top plan view on enlarged scale of one of the knife blades shown in FIG. 3;

FIG. 5a is a cross-sectional view taken on line 5a—5a of FIG. 5;

FIG. 6 is a top plan view on enlarged scale of the scrap removing finger shown in FIG. 3;

FIG. 6a is a side elevational view taken on line 6a13 6a of FIG. 6;

FIG. 7 is a fragmentary sectional view on enlarged scale taken generally on line 7—7 of FIG. 1 showing the operation of the closure heads incorporating the dual severing mechanism of the present invention as it would appear with the heads closed prior to severing;

FIG. 8 is a fragmentary sectional view similar to FIG. 7 showing the dual severing mechanism as it would appear severing the gathered tubing; and FIG. 9 is a fragmentary sectional view similar to FIGS. 7 and 8 wherein the closure heads have been withdrawn from their gathering position and the scrap tubing is being ejected from the scrap remover finger.

Referring to FIG. 1, the particular packaging machine shown therein is a chub packaging machine, Model 43, commercially available from the Kartridg Pak Co., Davenport, Iowa, which has been modified to include a double-knife severing mechanism constructed in accordance with the present invention. The machine is indicated generally at 15 and, as will be readily recognized by those familiar with chub machines, it has a film arbor 16, a pricer dater 17, a thermo conditioner 18, a canopy 20, a tube seam overlap sealer 21, a mandrel 22, a film drive 23, a voider 24, a closure head assembly 25, a wire cut-off mechanism 26 and a drive mechanism (not shown) positioned inside cover 28. All of the foregoing sub-assemblies or components are suitably mounted on the frame of the machine which is indicated generally at 30. Also mounted thereon is the electrical cabinet with control panel indicated at 31 and a piston-type product withdrawal mechanism 32. The wire-feeding mechanism (not shown) is on the rear of the machine and not visible in FIG. 1.

As is well known to those familiar with chub machines, a web of packaging film is continuously withdrawn from the arbor 16 when the machine is in operation. The web is led upwardly over the pricer dater 17, through the thermo conditioner 18, and thence to the film folder. In the film folder the side edges of the film are overlapped with the film being formed into a tube surrounding the upper portion of the mandrel 22. The sealer 21 acts to heat seal or otherwise bond the overlapped edges thereby completing the formation of a continuous tube. The film drive 23 engages the exterior of the tube and serves to continuously feed the tube downwardly. Below the film drive mechanism 23 the tube receives a metered quantity of flowable product through the mandrel 22. On passing through the voider 24 the voider rolls, at predetermined intervals, momentarily swing inwardly together compressing the product filled tube and thereby substantially voiding or expelling product from the portion of the tube which is flattened or compressed. Simultaneous with the voiding action the product withdrawal mechanism 32 relieves the product pressure in the tube by withdrawing an amount of product from the supply tube and returns it to the supply tube after voiding is completed. Each voided length of tube is gathered, has a pair of closure clips applied thereto, and is severed by the dual-knife mechanism (FIG. 3) of the invention as it passes downwardly with the reciprocating closure head 25. Each cut-off package falls into the large discharge chute 34 to be collected in a suitable container or falls onto a conveyor belt.

In operation the closure head assembly 25 reciprocates between lower and upper positions under the control of a cam drive. During the downward travel of the closure head assembly, when its velocity matches the film feed and therefore there is no appreciable relative movement therebetween, the assembly operates to gather the film where it has been voided and apply a pair of spaced clips thereto. The double knife severing mechanism (FIG. 3), which is mounted on the closure head assembly 25, operates to sever the packaging material at two discrete positions intermediate the spaced clips, thereby forming a piece of scrap tubing while separating the completed lower package from the upper package being formed. While the packages fall into the large discharge chute 34, the scrap tubing pieces are separated and moved into a small discharge chute 35.

One aspect of the present invention includes a package guide 27 (FIG. 1) mounted on the top of the closure head assembly 25 through which the continuous tube is fed. The guide is raised from the remainder of the head assembly and includes, in this embodiment, a hollow frusto-conical shape member extending downwardly from the top of the guide and having a bottom circular opening 27a (FIGS. 7-9) which is only slightly larger in diameter than the diameter of a package formed by the machine. As the product filled tube moves through the closure head assembly, the guide 27 limits tube-sidesway movement, thus providing greater accuracy in both positioning the closure clips on the tube, and severing the tube in close proximity to the clips. Also, a compressed air line 29 is mounted on the package guide. Its function will be discussed below in connection with the operation of the chub machine.

Referring to FIG. 2, the closure head assembly 25 includes a hollow, transversely extending, generally rectangular carriage or frame 36 supported at opposite ends by elevating shafts (not shown) which are reciprocably mounted in bushings 37—37 and driven by cams (not shown) forming a portion of the drive mechanism mounted behind cover 28 in the lower frame 30 as previously mentioned. Inside the carriage 36, end blocks 40, 41 are slidably mounted for transverse movement toward and away from each other. Guide strips 42 are mounted on the top of the side rails of carriage 36 along the opposed side edges of each end block 41, so as to retain them in the carriage while permitting their sliding movement. The end blocks 40 and 41 are provided with cam slots 43 and 44, respectively, which are adapted to receive cam rollers 45, 46, respectively. Each roller is operatively engaged with one of the operating shafts 50, 51 which are connected at their bottom ends in driving relation to the drive mechanism.

Block 40 has secured to its inner edge six relatively thin, inwardly projecting tube-constricting or closure plate members 52-57 (FIG. 7), each being shaped similar to plate 52 shown in FIG. 2. The plate members are slidably retained in superposed spaced relation, as shown most clearly in FIGS. 7-9, in longitudinally extending grooves along the inside surfaces of opposing side members (not shown) which are slidably mounted inside the opposing closure head carriage rails and retained therein by guide strips 42—42. The closure plates 52-57 are held together by plate pins 58—58 and form a first closure head 59. Block 41 has secured to its inner edge four relatively thin, inwardly projecting tube-constricting or closure plate members 60–63 each being shaped similar to plate 60 shown in FIG. 2 which are rigidly mounted in superposed spaced relation, as also shown most clearly in FIGS. 7–9, in additional grooves along the inside surfaces of the opposed slidable side members mentioned previously. The closure plates 60–63 are also held together by plate pins 64—64 and form a second closure head 65.

Each of the six tube-constricting plates 52–57 is provided on the inner free end thereof with a generally V-shape opening similar to opening 52*a* in FIG. 2 hereinafter denoted *a* after the plate number. Each of the openings 52*a*–57*a* has a recessed semi-circular central terminus similar to recess 52*b* in FIG. 2, hereinafter denoted *b* after the plate number. Likewise, each of the four opposing tubeconstricting plates 60–63 is provided on its inner face end with a generally V-shape opening identical to opening 60*a* in FIG. 2, hereinafter denoted *a* after the plate number. Further each of the openings 60*a*–63*a* has a rounded central terminus identical to terminus 60*b* in FIG. 2, hereinafter denoted *b* after the plate number.

Another aspect of the invention is shown in FIGS. 3–6*a*, wherein the parts of the double-knife cut-off which fit inside the closure head assembly 25 include a pair of modified interior right hand closure plates 61, 62 having elongate recesses 66, 67, respectively, therein which are each adapted to slidably receive one of a pair of knife members 70,71, respectively. A scrap removing finger, generally indicated at 72, is slidably mounted between the respective interior closure plates 61, 62 in a position previously occupied by a single knife member in prior chub machines. The two knife blades 70, 71 and the scrap removing finger are connected to a pair of conventional spaced apart closure clip applying anvils 73, 74. The location of these members will be discussed in further detail in connection with the operation of the invention.

Referring to FIGS. 4 and 4*a*, the modified interior right hand closure plate 61 is identical to plate 62, and as previously mentioned, includes a V-shape opening 61*a* extending inwardly of the front end of the closure plate and has a semicircular terminus 61*b* centrally positioned thereon. The remainder of the plate is substantially rectangular with the exception of opposed cut-out portions 68, 69 on the sides thereof. The interior closure plate 61 has attached thereto a backup or re-enforcing plate 75 mounted adjacent the rear of the plate 61 which includes a generally rectangular leading tip 76 having a leading edge positioned in registration with the closure plate semi-circular terminus 61*b*. Leading tip 76 is capable of being inserted in the recessed semi-circular terminus 53*b* of the opposing left hand closure plate 53. A pair of opposed shoulders 77, 78 slope outwardly and rearwardly from each side of the rear end of the leading tip in order to fit in the V-shape opening of the opposing left hand closure plate 53 when the closure heads are moved together in gathered position. The remainder of backup plate 75 is rectangular and extends to the rear of the sloping shoulders.

While in a conventional chub machine, the leading tip 76 is positioned immediately adjacent the semi-circular terminus 61*b*, so their sides touch, in the modified closure plate 61 of the invention, the recess 66 extends away from the backup plate 75, as shown most clearly in FIG. 4*a*, an amount sufficient to receive and retain the generally rectangular knife member 70 slidably therein. Recess 66 is generally rectangular in shape, is positioned across the semi-circular central terminus 61*b* in plate 61, and extends rearwardly thereof. Plate 61 further includes an elongate slot 80 positioned along the central axis thereof behind the semi-circular terminus 61*b* in spatial relation therewith. Backup plate 75 includes a like shaped slot 81 positioned in registration with slot 80. The function of the slots will be disclosed in greater detail as the operation of the chub machine is discussed.

One knife blade 70 of the identical pair thereof, is most clearly shown in FIGS. 5–5*a* to be generally thin, flat and rectangular in shape with the exception of an inwardly formed V-shape leading cutting edge 82. The cutting edge 82 is beveled to cut along the edge thereof nearest the closest adjacent closure clip. Knife blade 70 further includes a circular aperture 83 positioned inwardly adjacent the rear thereof through which a bolt 84 (FIG. 7) aligns the respective clip closure anvils and dual knife cutting mechanism.

The scrap removing finger 72, which is positioned between inner closure plates 61 and 62, is shown most clearly in FIG. 6 to include an elongate generally rectangular body including a thick rearward portion 72*a*, and a thin leading portion 88 defined by an inwardly extending leading V-shaped notch 89 having a recessed hollow terminus 89*a* at the vertex thereof. The boundary between the thick rearward portion 72*a* and thin leading portion 88 is defined by a leading surface 90 and pair of opposed shoulders 91–92 which slope outwardly and rearwardly from the leading surface in order to fit in the V-shaped opening of an opposing left hand closure plate 54 when the closure heads 59 and 65 are in gathered position. A bolt hole 93 extends through the thick rear portion 72*a* of the scrap removing finger spatially adjacent the leading surface 90 and provides for receiving bolt 54 and thereby aligning the scrap removing finger with the remainder of the cutting mechanism as shown in FIGS. 3 and 7–9.

Referring to FIG. 2, a further feature of the present invention resides in the disposal of the scrap film, wherein the small scrap removing chute 35 is affixed to a mounting member 35*a* which forms an upward extension of the large discharge chute 34. Small discharge chute 35 is a channel member which is affixed on its mounting to extend downwardly and away from the large discharge chute 34 to one side thereof. The upper end of small chute 35 extends slightly into the area defining the opening of large chute 34 so as to receive scrap pieces therein as they are discharged from the scrap removing finger 72.

The operation of the double knife cut-off or severing mechanism of the invention is shown most clearly in FIGS. 7–9 wherein, specifically in FIGS. 7 and 8, the closure heads 59, 65 have been moved together to close around a short length of voided tubing 85 positioned between upper and lower filled portions of tubing 86, 87, respectively. In FIG. 7, a pair of U-shaped closure clips 90–91 have been positioned around the short length of gathered tubing 85 by a pair of clip positioners 93, 94 which are slidably retained in the left hand closure head 59 between spatially adjacent closure plates therein. While the heads have closed in FIG. 7, the closure clips 90, 91 have not yet been clinched. The clinching anvils 73, 74 as well as the double knife members 70, 71 and scrap removing finger 72 are in a retracted position, and they are aligned for sliding co-action by bolt 84 and a coventional known punch and knife cam (not shown) which is positioned rearwardly of the aligned semi-circular plate terminuses in the right hand closure head.

In the operation of the severing mechanism of the invention shown most clearly in FIG. 8, the alignment bolt 84 and all the members connected thereto have been moved forwardly relative the right hand closure member which, in one motion, clinches closed the clips 90, 91 and severs the short length of tubing 85 along edges 95 and 96 thereby forming a central scrap piece 97 which is held in the central recess 89a of scrap removing finger 72. Scrap piece 97 approximates ⅜ inch in length, and includes most of the droplets or residual matter which may be retained in the short length of gathered tubing between closure clips 90 and 91. The clinching of the clips 90, 91 around the gathered tubing forces most of the residual matter away from the immediate gathered space enclosed by each clip.

In FIG. 9, the left and right hand closure heads 59, 65, respectively, have opened (moved apart) which allows the completed lower package 87 to drop into large discharge chute 34. As the right hand closure head is withdrawn, the alignment bolt 84 and the punch and knife cam remain in the forward position so the scrap piece 97, held in the scrap removing finger 72, is moved to the right out of a path leading to large chute 34. When the scrap is moved so as to be positioned immediately above the small chute 35, the alignment bolt 84 and all of the members mounted thereon, including scrap removing finger 72, are moved rearwardly relative the left hand closure head 65 by the punch and knife cam. The semicircular terminuses 61b, 62b on their respective closure plates force the scrap piece 97 out of the central recess 89a on scrap removing finger 72. A blast of compressed air from the air line 29 moves through nozzle 29a and forces the scrap piece 97 downwardly into small chute 35 and onto the top surface 30a of frame 30, or into a suitable container positioned there which provides for convenient removal of the scrap pieces as they are formed.

The double knife cutting mechanism of the invention is made suitable for use as a replacement kit which may be installed in any existing chub machine, thus providing shorter, superior tail or stub ends to the tubular packages with minimal modification to the many existing chub machines, or machines of like type.

It will be understood that modifications and variations may be effected without departing from the scope or the novel concepts of the present invention. For example, the package which is formed continuously in the chub machine, may be formed intermittently, with the tube being stationary during cutting. Also, the dimensions given for the chub machine may vary slightly in other machines having a similar function. Therefore, it is understood that this application is limited only by the scope of the appended claims.

What is claimed as new is:

1. In a machine for forming chub packages and having: means for forming a web of packaging material into a tube; means for continuously feeding said tube downwardly over a hollow vertical mandrel; means for delivering a flowable product to said mandrel so as to continuously discharge product from the bottom end thereof into said tube; voider means for substantially voiding product from short lengths of said tube at predetermined intervals; reciprocating head means having a passageway through which said tube descends, said reciprocating head means containing oscillating opposed passage restricting members which gather voided short lengths of said tube, first means adjacent said passage restricting members for applying a pair of spaced clips to each said gathered length; and, second means adjacent said passage restricting members for severing said gathered tube intermediate said pairs of clips; the improvement wherein said severing means includes a pair of spaced apart knives for cutting through said gathered lengths at two different positions thereon, each cut being in close proximity to one clip of said pair thereof, said cuts defining a scrap piece of said tubing, and means positioned intermediate said pair of knives for removing said scrap piece from each of said packages.

2. The improvement called for in claim 1 wherein predetermined ones of said passage restricting members each include an elongate recess therein adapted for receiving and retaining one of said knives in sliding relation therein.

3. The improvement called for in claim 2 wherein said knives and scrap removing means are also connected with said first means for co-action in simultaneous sliding movement.

4. The improvement called for in claim 1 wherein said scrap removing means further includes compressed gas directing means for moving said scrap pieces from said reciprocating head means.

5. The improvement called for in claim 1 wherein said scrap removing means further includes a scrap discharge guide positioned below said reciprocating head means for diverting said scrap pieces from the path of travel of said packages through said machine.

6. The improvement called for in claim 1 wherein each of said knives is slidably retained in an elongate recess on one of two adjacent passage restricting members, said scrap removing means is slidably retained between said adjacent passage restricting members, and said knives and retaining means are connected for co-action in simultaneous sliding movement.

7. The improvement called for in claim 1 wherein said reciprocating head means include a package guide positioned on top thereof, defining an upper portion of said passageway therethrough, said guide including an annular flange through which said said tube descends, the size of the hollow interior of said flange limiting the movement of said tube in any direction other than along its predetermined path of travel through said machine.

8. In a vertically reciprocating head assembly for a chub packaging machine, or the like, having left and right opposed horizontally reciprocating heads, each head including a plurality of horizontally disposed plate members positioned in vertical spaced registration and the respective plates of one head each being received in corresponding spaces between adjacent plates in the opposing head as said heads move horizontally toward each other to a closed position; each of said plates including a V-shape opening at the leading edge thereof, and the opening in opposing plates defining a variable size aperture therebetween as said heads move; said heads including a pair of closure clip applying mechanisms mounted thereon in vertical spaced registration between adjacent plates thereof and in communication with said variable size aperture, each of said clip applying mechanisms including two mating clip applying members with one such member mounted in each said head so as to be in opposed horizontal registration with the mating member; the other of said heads including the other half of each of said pair of closure clip mechanisms mounted thereon so as to be in aligned relation with each of said one-half thereof; and an improvement comprising: a dual-knife severing mechanism mounted on one of said heads in communication with said variable size aperture and including a pair of knives horizontally mounted in vertical spaced relation between said pair of clip applying mechanisms, each of said knives being slidably retained on an elongate recess centrally positioned on one of said plate members; and scrap removing means slidably mounted on said one head between said pair of knives, said scrap removing means having a bifurcated distal portion for receiving and temporarily retaining therein a piece of scrap packaging material.

* * * * *